(12) United States Patent
Hess

(10) Patent No.: US 10,315,554 B2
(45) Date of Patent: Jun. 11, 2019

(54) FLOATING GUIDE-ON POST ASSEMBLIES FOR PONTOON BOAT TRAILERS

(71) Applicant: Gordon Henry Hess, Pueblo West, CO (US)

(72) Inventor: Gordon Henry Hess, Pueblo West, CO (US)

(*) Notice: Subject to any disclaimer, the term of this patent is extended or adjusted under 35 U.S.C. 154(b) by 94 days.

(21) Appl. No.: 15/603,169

(22) Filed: May 23, 2017

(65) Prior Publication Data

US 2017/0341561 A1    Nov. 30, 2017

Related U.S. Application Data

(60) Provisional application No. 62/340,764, filed on May 24, 2016.

(51) Int. Cl.
*B60P 3/10* (2006.01)

(52) U.S. Cl.
CPC .................. *B60P 3/1075* (2013.01)

(58) Field of Classification Search
CPC ..................................... B60P 3/1075
USPC ..................................... 280/414.1
See application file for complete search history.

(56) References Cited

U.S. PATENT DOCUMENTS

| | | | | |
|---|---|---|---|---|
| 3,608,754 A | * | 9/1971 | Park | B60P 3/1033 114/344 |
| 4,010,962 A | * | 3/1977 | Groblebe | B60P 3/1075 280/414.1 |
| 4,268,211 A | * | 5/1981 | Schwebke | B60P 3/1075 280/414.1 |
| 4,715,768 A | | 12/1987 | Capps | |
| 4,858,943 A | * | 8/1989 | Cote | B60P 3/1075 280/414.1 |
| 5,596,944 A | * | 1/1997 | Massie | B60P 3/1075 116/202 |
| 7,896,382 B2 | | 3/2011 | Heck | |
| 8,006,995 B2 | | 8/2011 | Caudill | |
| 8,628,105 B2 | | 1/2014 | MacKarvich | |
| 2003/0137124 A1 | * | 7/2003 | Marchese | B60P 3/1075 280/414.1 |
| 2012/0261898 A1 | * | 10/2012 | MacKarvich | B60P 3/1075 280/414.1 |

(Continued)

*Primary Examiner* — Tony H Winner
(74) *Attorney, Agent, or Firm* — BL Speer & Associates; Brenda L. Speer

(57) ABSTRACT

The present invention relates generally to boat trailers and, more particularly, to an improved, automatic, self-leveling floating guide-on post assembly mounted to a pontoon boat trailer. A pair of floating guide-on post assemblies are mounted on the rear member of a trader frame in the cavity between the pontoons of a pontoon boat. The floating guide-on post assemblies each include an upwardly extending cylindrical shaped exterior support tube, and a buoyant interior cylinder tube and wheel assembly adapted to contact and guide a pontoon during loading on and unloading off a boat trailer. The floating guide-on post assemblies include a mounting system comprised of U-shaped bolts and clamps that allow the guide-on post to be mounted to a pontoon boat trailer frame. Accordingly, when a pontoon trader is backed down a boat ramp, the guide-on post assemblies will automatically extend to the water level, thus remaining visible and capable of assisting in the loading on and unloading off a pontoon boat to and from a boat trailer.

15 Claims, 9 Drawing Sheets

(56) References Cited

U.S. PATENT DOCUMENTS

2015/0197176 A1 7/2015 Schiller
2016/0090028 A1* 3/2016 Krejci ................... B60Q 1/305
                                                       362/485

* cited by examiner

FLOATING GUIDE-ON POST ASSEMBLIES FOR PONTOON BOAT TRAILERS

CROSS-REFERENCE TO RELATED APPLICATION

This application claims the benefit of priority under 35 U.S.C. § 119(e) from U.S. Provisional Application Ser. No. 62/340,764, filed May 24, 2016, titled "Floating Boat/Pontoon Guides" and the entire contents of which are incorporated by reference herein and should be considered a part of this specification.

BACKGROUND OF THE INVENTION

Field of the Invention

The present invention relates generally to a floating guide-on post assemblies for loading and unloading a pontoon boat on and off a boat trailer.

Description of Related Art Including Information Disclosed Under 37 CFR § 1.97 and 37 CFR § 1.98

While boating is fun and relaxing, there are some tasks associated with boating that are not always pleasant. One task that many boaters do not enjoy is that of loading the boat back onto the trader in order to remove the boat from the water.

A common style of boat for basic, general boating is that of the pontoon boat. The ease of use of a pontoon boat suffers from the fact that the boat is difficult to load on and unload off transport trailers. Aligning the pontoons of a pontoon boat onto the bunk boards of a trailer is particularly difficult under rough water or windy conditions.

One solution has been the addition of guide rails on a trailer. The guide rails extend along the support rails, also called trader bunk boards, and fit inside the cavity between the pontoons of a pontoon boat. When a pontoon boat is driven or winched onto a trailer, the guide rails line up the boat's pontoons with the trailer's bunk boards. However, because boat ramps are sloped, the rear of the trailer and the guide rails are often underwater and, thus, rendered unable to perform their intended purpose. Furthermore, the slope of boat ramps may vary greatly and, thus, a trailer with guide rails that may work at one ramp location may not work at all at another other ramp location.

U.S. Pat. No. 4,715,768 issued Dec. 29, 1987, by Capps for "Boat Trailer Guide" discloses an improved boat trailer guide-on comprising bracket means that adjustably attaches to a conventional boat trailer and holds a substantially vertical shaft means with telescopically extendable foamed plastic rollers thereon. Such a device allows the roller to float upwards as the boat trailer is backed into the water, thus remaining visible and capable of assisting in the loading and unloading of a boat. Optionally, the top of the floating, telescopically extendable, roller is equipped with a tail light lamp for assisting in loading and unloading after dark.

U.S. Pat. No. 7,896,382 issued Mar. 1, 2011, by Heck for "Pontoon Boat Trailer Guide" discloses a pontoon boat trailer guide that includes a structure in between pontoon bunks or cradles. The guide structure comprises an upper portion which is narrower than a lower portion. The upper portion provides a visual and gross centering guide. The lower structure provides a fine and automatic self-centering guide for alignment and trailering of the pontoon boat.

U.S. Pat. No. 8,006,995 issued Aug. 30, 2011, by Caudill for "Boat Trailer with Adjustable Rails and an Automatic Latch" discloses a boat trailer that has sloped and adjustable guide rails which are higher at the rear of the trailer as compared to the front of the trailer. Accordingly, when backed down a boat ramp the guide rails extend above the water in order to engage the pontoons of a boat. This arrangement of guide rails allows a boat to be powered onto the trailer where it can be latched automatically into place.

U.S. Pat. No. 8,628,105 issued Jan. 14, 2014, by MacKarvich for "Boat Trailer with Floatable Bunk Board Guide-On Posts" discloses a pair of bunk board guide-on post assemblies that are mounted on opposite sides of the frame of a boat trailer just at the aft ends of the bunk boards of the trailer. The guide-on post assemblies each include a rectilinear upwardly extending support bar that defines a longitudinal slot, and a buoyant guide-on post is telescopically mounted downwardly about the support bar and defines a laterally extending connector opening that registers with the longitudinal slot. A connector pin extends through the laterally extending connector opening of the guide-on post and through the longitudinal slot of the upwardly extending support bar so that the buoyancy of the guide-on posts telescopes upwardly in response to partial immersion of the bunk boards of the boat trailer, providing a visual indication of the location of the submerged ends of the bunk boards.

US Patent Publication 2015/0197176 published Jul. 16, 2015, by Schiller for "Pontoon Boat Loading Guide" discloses an apparatus adapted to provide a loading guide for loading a pontoon boat onto a boat trailer and includes a mounting plate to allow the guide to be mounted to the frame of a boat trailer and a wheel adapted to contact and guide a pontoon during loading. The wheel includes a center axis and a tire. The wheel center axis is mounted vertically so that the pontoon body will come in contact with the outer surface of the tire and the wheel will rotationally guide the pontoon down its length as the boat is loaded. A plurality of these guides are mounted on the boat trailer to provide a system of loading guides for optimum support of the pontoon boat during loading and unloading.

The prior art does not address all the issues in need of solution, such as ease of loading on and unloading off transport trailers, aligning the pontoons of a pontoon boat onto the bunk boards of a trailer under rough water or windy conditions, or overcoming the deficiency of the guide rails of the trailer being under water during loading and unloading. Accordingly, there exists a need for a means by which a pontoon boat can be more easily loaded on and unloaded off a trailer.

BRIEF SUMMARY OF THE INVENTION

The present invention is a floating guide-on post assembly for a pontoon boat trader comprising an upwardly extending exterior cylindrical or tubular shaped support tube or sleeve open at both ends allowing water to enter the sleeve when submerged; wherein the exterior tube or sleeve is supporting and surrounding an upwardly extending interior cylindrical or tubular shaped float tube or sleeve sealed with a cap; further wherein the float tube has an open lower end and a capped upper end that traps air in response to the level of water rising above the open lower end; further wherein the interior cylindrical shaped float tube supports a laterally mounted wheel and tire assembly; further wherein the air trapped in the tire adds to the buoyancy of the interior cylindrical shaped float tube; further wherein the interior cylindrical shaped float tube and wheel assembly location is variable along the inside of the upwardly extending exterior tubular shaped support sleeve and will extend upwardly or retract downwardly depending on the surrounding water level; and further wherein a mounting bracket means attaches the exterior cylindrical support tube to a rear cross member of a pontoon boat trailer frame and the mounting bracket means is adjustable horizontally and vertically on the rear cross member of the pontoon boat trailer frame. The float tube is in telescopic relation to and within the support tube and telescopically extends from and retracts into the support tube in relation to a buoyant or non-buoyant position of the wheel and tire assembly on the water level.

The floating guide-on post assembly may further comprise a pair of floating guide-on post assemblies mounted on the rear cross member of a pontoon boat trader, wherein the respective height of the floating guide-on post assemblies will automatically telescope to the water level by means of a pair of floating guide-on post assemblies, further wherein a first wheel and tire assembly and a second wheel and tire assembly are buoyant and able to float when submerged in water such that a top portion of each of the first and second guide wheel and tire assemblies rise with and float upon the water level. Preferably, the floating guide-on post assemblies are positioned on a rear cross member of a pontoon boat trailer in a cavity area formed between pontoons of a pontoon boat loaded on the trader. Preferably, the wheel and tire assembly of a post assembly are in close proximity to a pontoon such that the pontoons will contact the wheel and tire assembly and guide the boat when it is loaded on and unloaded off the trailer. When the tire is in contact with the pontoon, the tire is able to rotate about the vertical axis of the interior float tube and allow the pontoon to be guided about the floating guide-on post assembly.

The floating guide-on post assembly has an interior cylindrical shaped float tube that is tubular and formed of a strong, sturdy, durable material that is buoyant in water, such as plastic pipe and the like, and supports a wheel and tire assembly that adds to the buoyancy of the floating guide-on post assembly. The wheel and tire assembly is axially and rotatively mounted to a distal end, relative to the exterior cylindrical shaped support tube, of the interior cylindrical shaped float tube, wherein the outer circumferential surface of the wheel and tire assembly is adapted to contact and rotatively guide a surface of pontoons of a pontoon boat during loading and unloading events on and off the trailer. Further, the interior cylindrical shaped float tube is telescopically mounted inside the exterior cylindrical shaped support tube. Preferably, the wheel and tire assembly comprises a pneumatically inflatable or a foam filled tire body.

Figure 1:
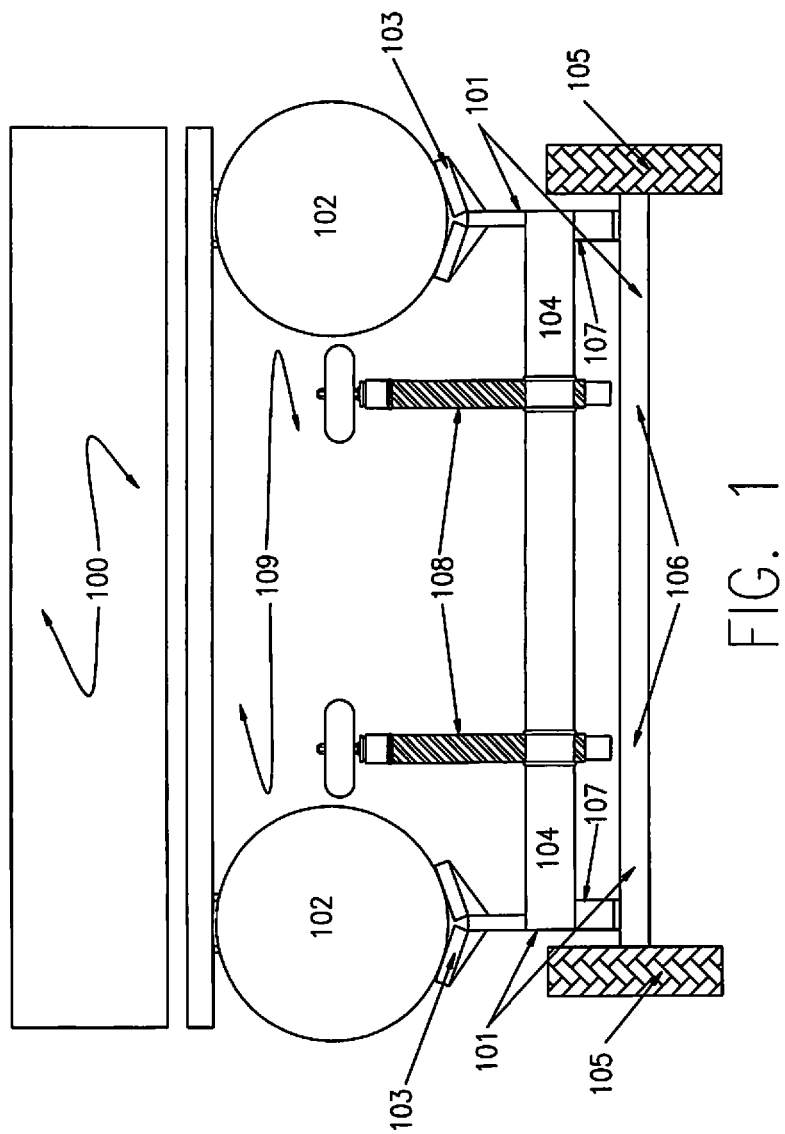
FIG. 1 is a rear elevation view of a pontoon boat trader having boat pontoons resting on bunk boards of the trailer and having floating guide-on post assemblies mounted on a rear of the trader in a cavity between the boat pontoons.
Figure 2:
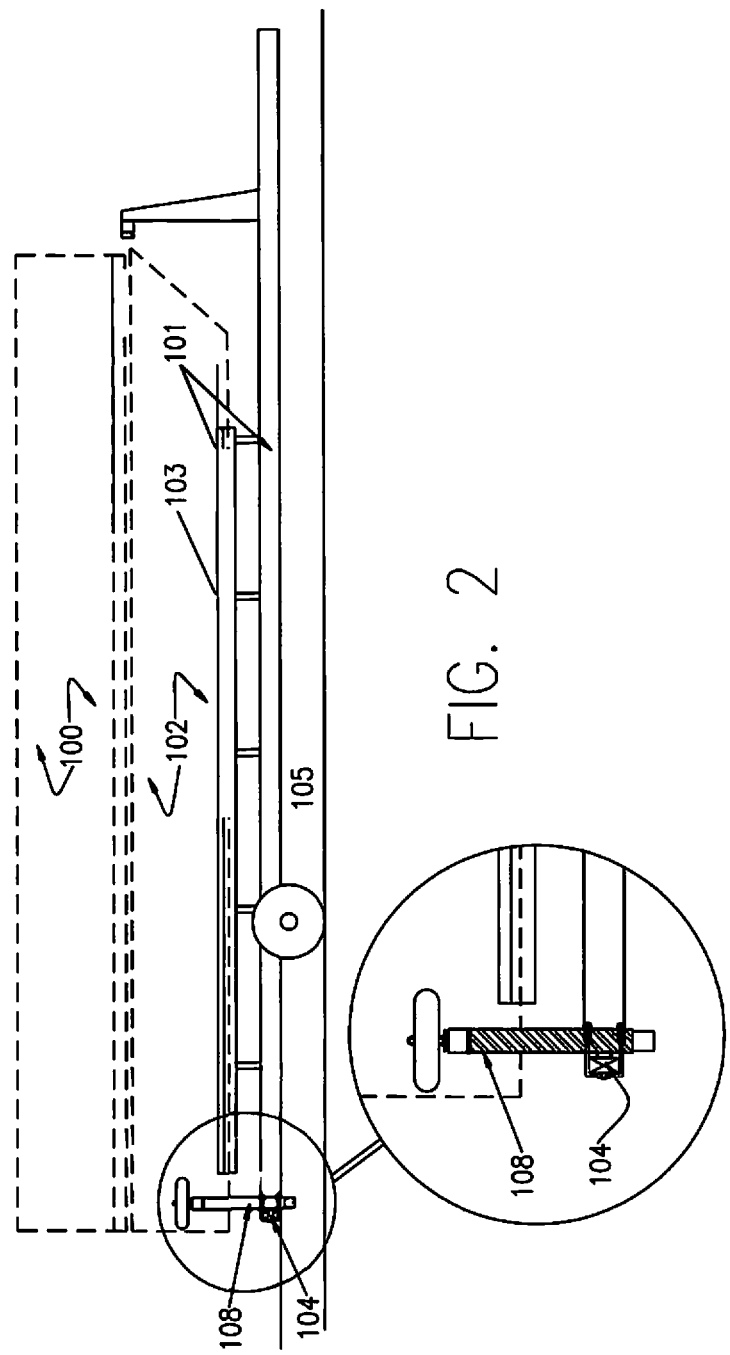
FIG. 2 is a side elevation view of the boat trader on level ground having a pontoon boat thereon as depicted with dashed lines and having a floating guide-on post assembly shown in a retracted position.

LIST OF REFERENCE NUMERALS 100 rear of a pontoon boat
101 boat trailer
102 pontoon(s)
103 bunk board(s)
104 trailer frame
105 wheel(s)
106 axle
107 suspension spring(s)
108 post assembly(ies)
109 cavity between pontoons
110 exterior support tube
111 interior float tube
112 cap
113 wheel and tire
114 axle bolt
115 axle nut
116 U-shaped bolt(s)
117 clamp(s)

118 support saddle
119 "X" pattern
120 through-hole
121 nut(s)
122 retention cable
123 boat ramp
124 water level

DETAILED DESCRIPTION OF THE INVENTION

The present invention relates to a pontoon boat trailer with floating guide-on post assemblies for guiding a boat operator when the boat operator drives a pontoon boat through water and toward the trader to mount the boat on the bunk boards of the trailer.

The disadvantages of the prior art are overcome by the present invention which provides a floating guide-on post assembly that includes an exterior cylindrical tube supporting a buoyant interior cylindrical tube and wheel assembly. The interior tube assembly is telescopically mounted in the exterior tube assembly. The exterior tube assembly is affixed to the distal ends of a boat trailer in an upward direction. The interior cylinder tube assembly has a wheel axially mounted to one end of the cylindrical tube. The interior tube assembly and wheel and tire float on the surface of the water allowing the outer circumferential surface of the tire to come into rotational contact with and to guide a pontoon boat during loading and unloading events on and off a trailer.

Accordingly, when a trader is backed down a boat ramp the interior tube and wheel upwardly extend above the water in order to engage the pontoons of a boat. The floating guide-on post assembly of the present invention provides a boat operator the ability to load and unload a pontoon boat on and off a trailer in a manner that not only is quick, easy and effective, but also is safe and damage-free for the boat as well.

FIG. 1 illustrates the rear of a pontoon boat 100 mounted on a boat trailer 101 with pontoons 102 of the pontoon boat 100 resting on bunk boards 103 of the trader. The boat trailer 101 includes a frame 104, wheels 105, an axle 106 and suspension springs 107 supporting the frame 104 on the axle 106. The bunk boards 103 are mounted rigidly or pivotally to the frame 104 as is known in the prior art. Floating guide-on post assemblies 108 are mounted on a rear cross member of the trader frame 104 in a cavity 109 between the pontoons.

Figure 8:
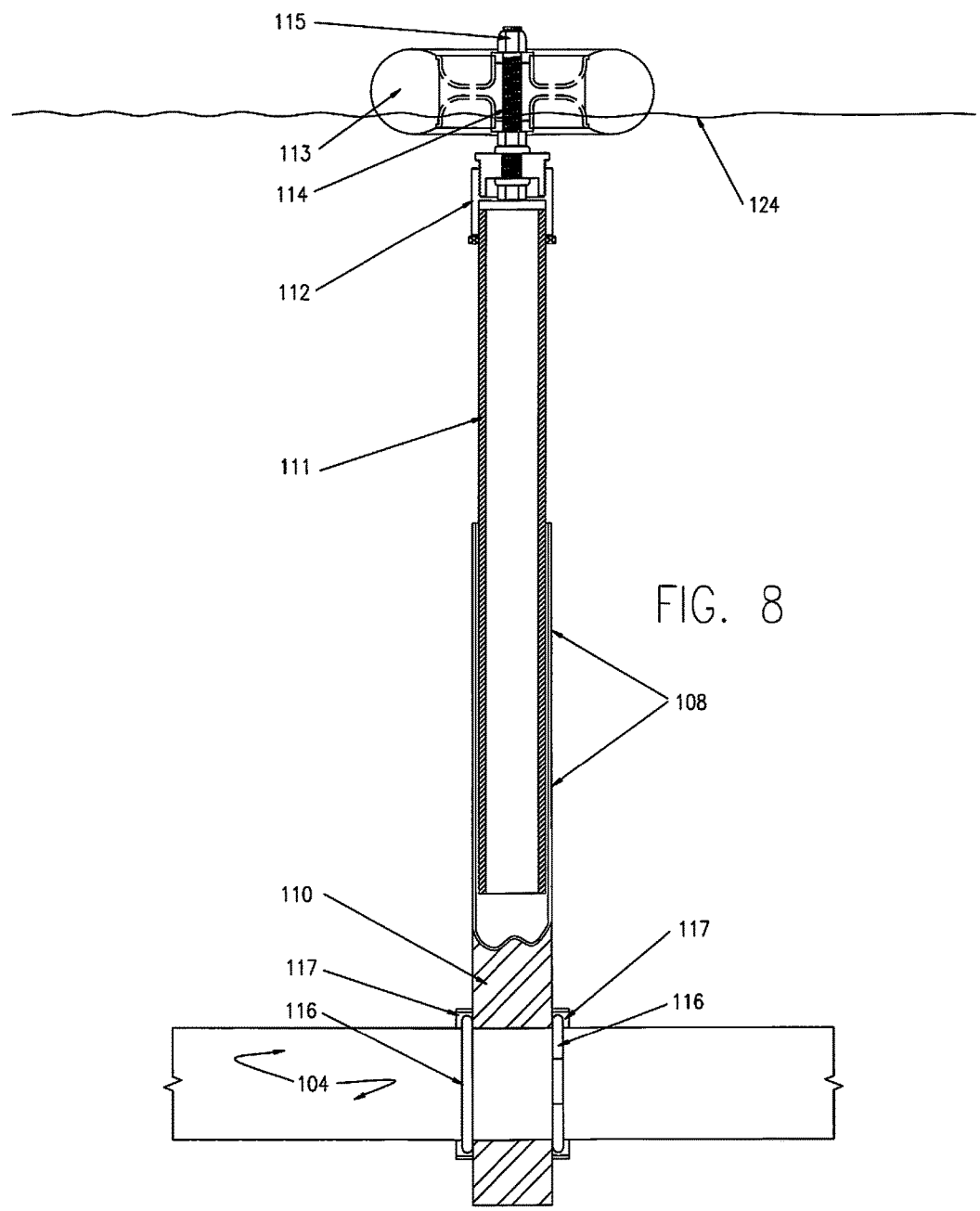
FIG. 8 is a cross-sectional, rear elevation view of the floating guide-on post assembly mounted to the 2"×4" rear cross member of the trailer frame with the floating guide-on post assembly as shown from a rear of the trailer.
Figure 9:
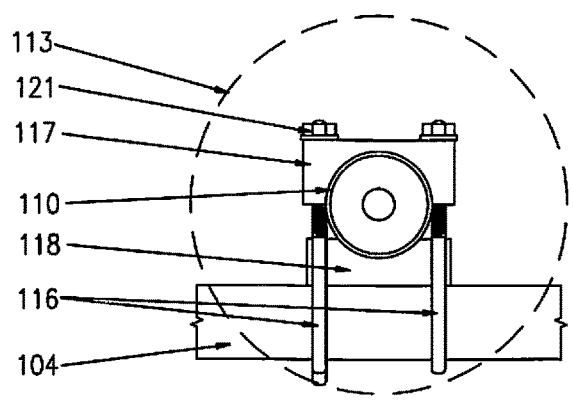
FIG. 9 is a top view of the floating guide-on post assembly mounted to the 2"×4" rear cross member of the trailer frame with the wheel and tire depicted with dashed lines.
Figure 10:
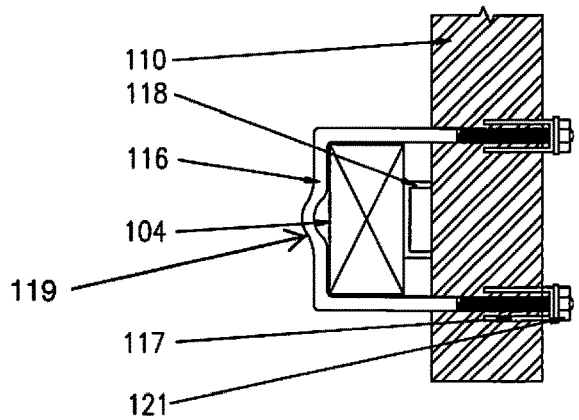
FIG. 10 is a partial side elevation view of the floating guide-on post assembly mounted to the 2"×4" rear cross member of the trailer frame.
Figure 11:
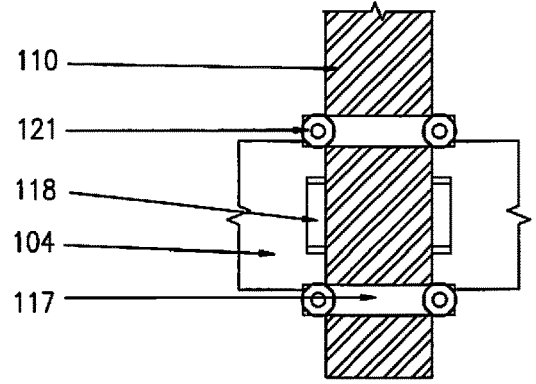
FIG. 11 is a partial front elevation view of the floating guide-on post assembly mounted to the 2"×4" rear cross member of the trailer frame showing the floating guide-on post assembly from the front of the trailer.
Figure 12:
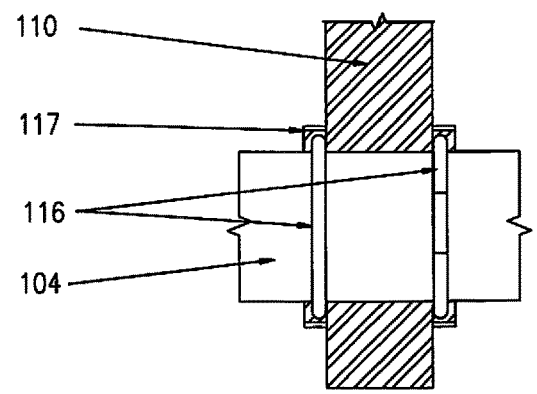
FIG. 12 is a partial rear elevation view of the floating guide-on post assembly mounted to the 2"×4" rear cross member of the trailer frame showing the floating guide-on post assembly from the rear of the trailer.
Figure 13:
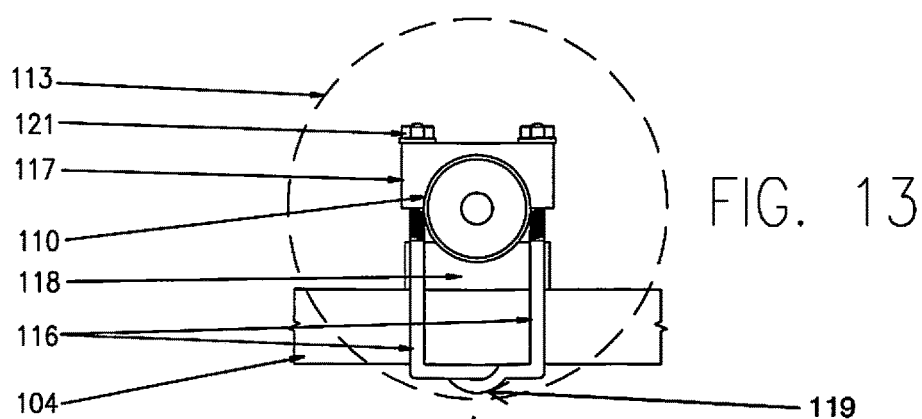
FIG. 13 is a top view of the floating guide-on post assembly mounted to the 2"×4" rear cross member of the trailer frame with the wheel and tire shown with dashed lines.
Figure 14:
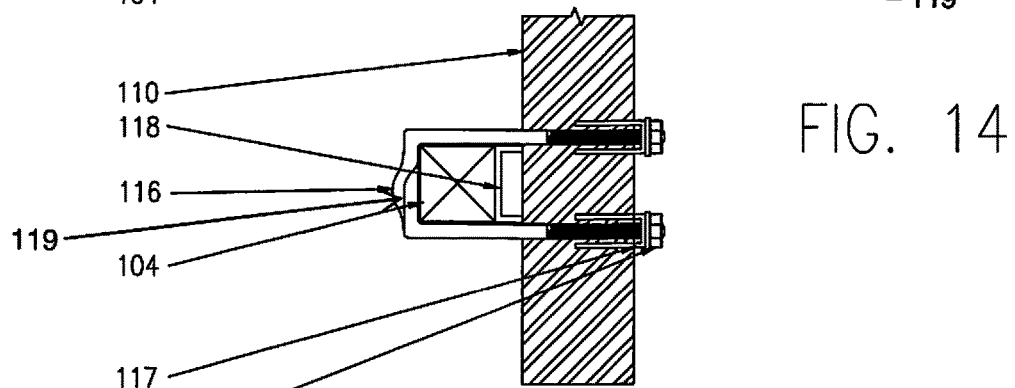
FIG. 14 is a partial side elevation view of the floating guide-on post assembly mounted to the 2"×4" rear cross member of the trailer frame.
Figure 15:
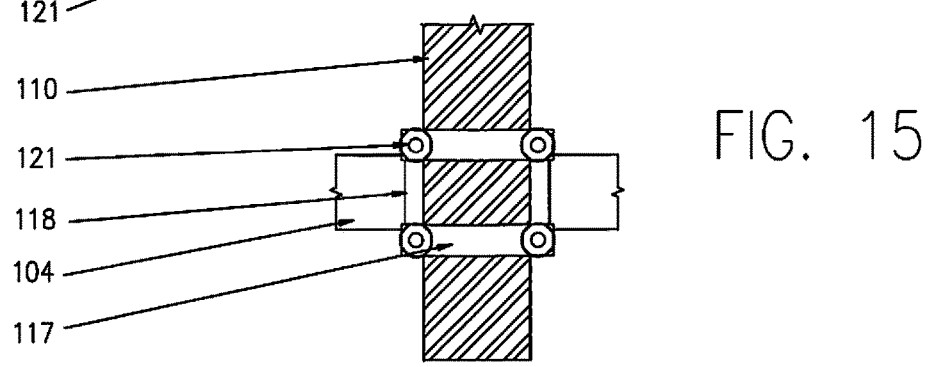
FIG. 15 is a partial front elevation view of the floating guide-on post assembly mounted to the 2"×4" rear cross member of the trailer frame showing the floating guide-on post assembly from the front of the trailer.
Figure 16:
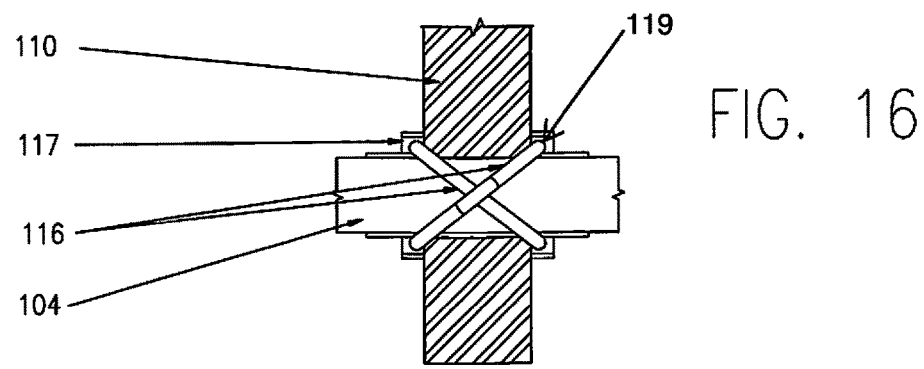
FIG. 16 is a partial rear elevation view of the floating guide-on post assembly mounted to the 2"×4" rear cross member of the trailer frame showing the floating guide-on post assembly from the rear of the trailer.

As shown in FIG. 8 a floating guide-on post assembly 108 includes an exterior cylindrical shaped support tube 110 and an upwardly extending interior cylindrical shaped float tube 111. The float tube 111 is water tight and sealed with a cap 112. In addition to sealing the float tube 111, the cap 112 also supports a laterally mounted wheel and tire 113. The wheel and tire 113 are attached to the cap 112 by using an axle bolt 114 and axle nut 115. The axle bolt 114 passes through the center of the cap 112 in a vertical direction. The wheel and tire 113 are then fixed in place by the use of the axle nut 115.

As shown from various perspectives in FIGS. 8, 9, 10, 11 and 12, is a mounting system consisting of two U-shaped bolts 116, supporting two clamps 117, and a steel cylinder support saddle 118 that is used for mounting the exterior cylindrical support tube 110 to a 2"×4" rear cross member of the frame 104 of the trailer 101.

As shown from various other perspectives in FIGS. 13, 14, 15 and 16 is the mounting system consisting of two U-shaped bolts 116 diagonally installed across a 2"×2" rear cross member of the frame 104 of the trailer 101 and forming an "X" pattern 119, two supporting clamps 117, and the steel cylinder support saddle 118 that is used for mounting the exterior cylindrical support tube 110 to a 2"×2" rear cross member of the frame 104 of the trader 101.

Figure 7:
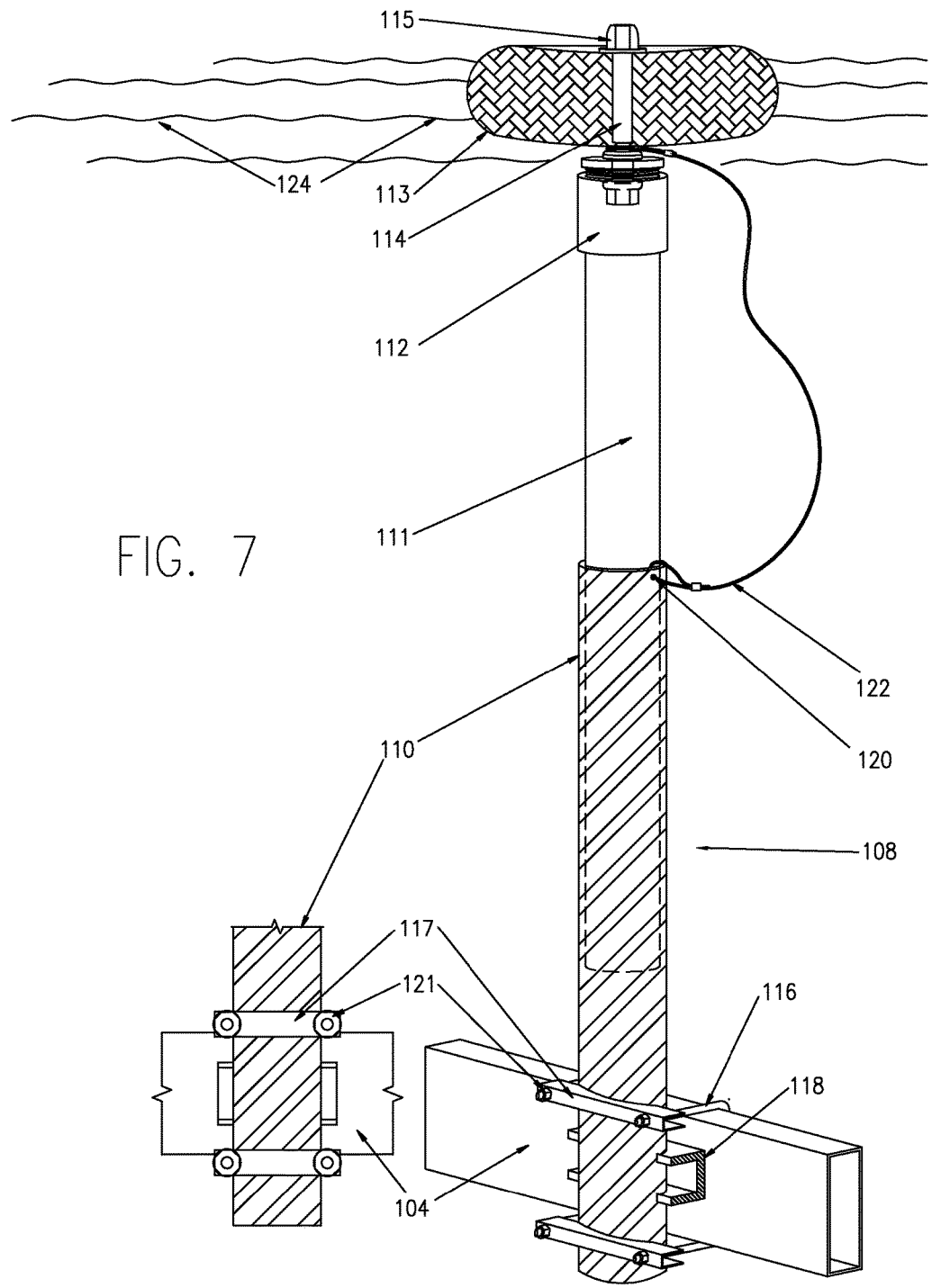
FIG. 7 is a perspective view of the floating guide-on post assembly mounted to a 2"×4" rear cross member of the trailer frame and in the extended configuration as shown from a front of the trailer.

As shown in FIG. 7, once the exterior cylindrical support tube 110 is placed between the cylinder support saddle 118 and the supporting U-shaped bolt clamps 117, the nuts 121 of the U-shaped bolts 116 are tightened to secure the exterior cylindrical shaped support tube 110 to the rear cross member of the trailer frame 104.

As shown in FIG. 7 the floating guide-on post assembly 108 includes a floatable upwardly extending interior cylindrical shaped float tube 111 with a cap 112 which supports thereon a laterally mounted wheel and tire 113. In the preferred embodiment of the present invention, the interior cylindrical tube 111 is a water tight support for the wheel and tire 113. The cap 112 closes the upper portion of the tube 111 to form a water tight seal and is open at its lower end trapping air within the interior of the tube 111. Additionally, the air trapped in the laterally mounted wheel and tires 113 add to the buoyancy of the floating guide-on post assembly.

As shown in FIG. 1 the floating guide-on post assemblies 108 may be moved closer to or farther away from the bunk boards 103 and by sliding the floating guide-on post assemblies 108 laterally on the rear cross member of the frame 104.

As shown in FIG. 7 the floating guide-on post assemblies 108 each include an optional leash or retention cable 122. One end of the retention cable 122 is attached by means of a through-hole 120 within an upper end of the exterior support tube 110. The other end of the retention cable 122 is looped around the axle bolt 114 of the upwardly extending interior cylindrical shaped float tube 111. The retention cable 122 serves to prevent the interior float tube 111 from becoming separated from the exterior support tube 110.

As shown in FIGS. 2, 3, 4, 5, 6, 7 and 8, when the boat trailer 101 travels down a boat ramp 123 until its bunk boards 103 are submerged at their aft ends, a water level 124 will begin to rise relative to the floatable guide-on posts assemblies 108. As the trailer 101 travels farther down the boat ramp 123, the water level 124 will rise and the trapped air inside the floatable upwardly extending interior cylindrical shaped float tube 111, in combination with the air in the wheel and tire 113, will cause the floatable guide-on post assemblies 108 to become buoyant. The buoyancy serves to lift the guide-on posts 108 against the forces of gravity so that the guide-on posts 108 are extended upwardly along the upwardly extending exterior support tubes 111 enabling the wheel and tire 113 to float at the water level 124.

Figure 3:
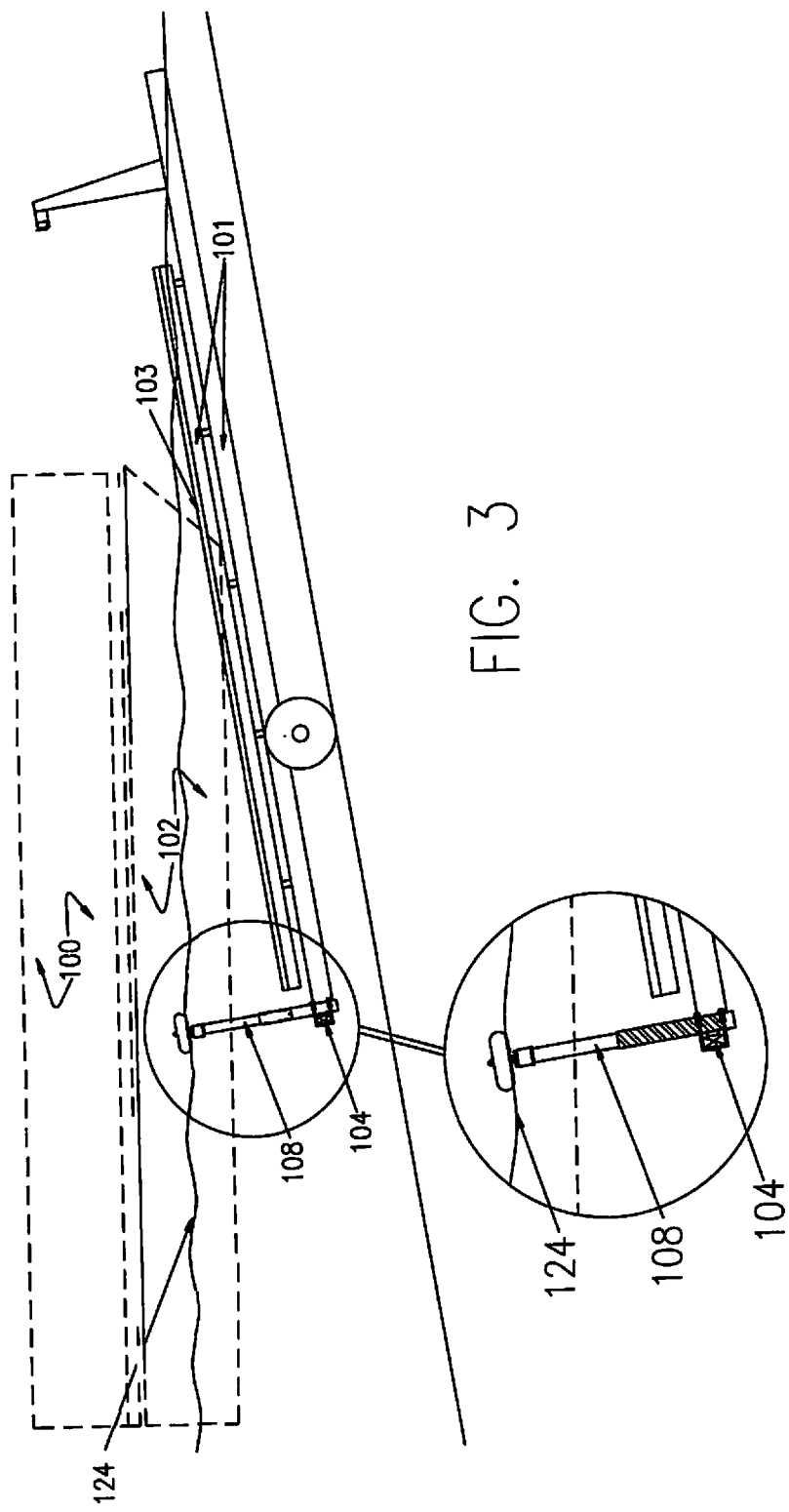
FIG. 3 is a side elevation view of the boat trader in relationship to a boat ramp and a water line having a pontoon boat thereon as depicted with dashed lines and having floating guide-on post assemblies mounted on the rear of the trailer, wherein the floating guide-on post assemblies are underwater and extended to a surface of the water line.
Figure 4:
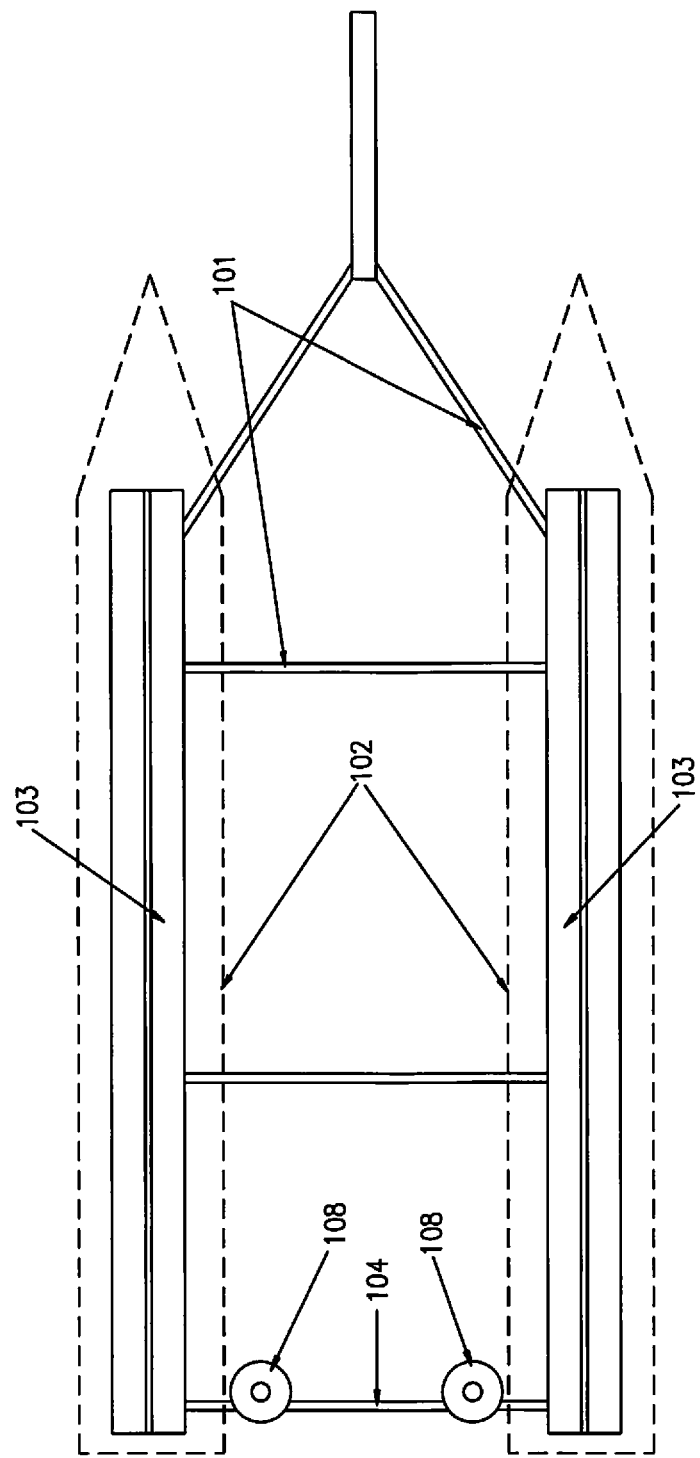
FIG. 4 is a top view of a trailer showing the floating guide-on post assemblies mounted on a rear cross member of the trailer frame.
Figures 5, 6:
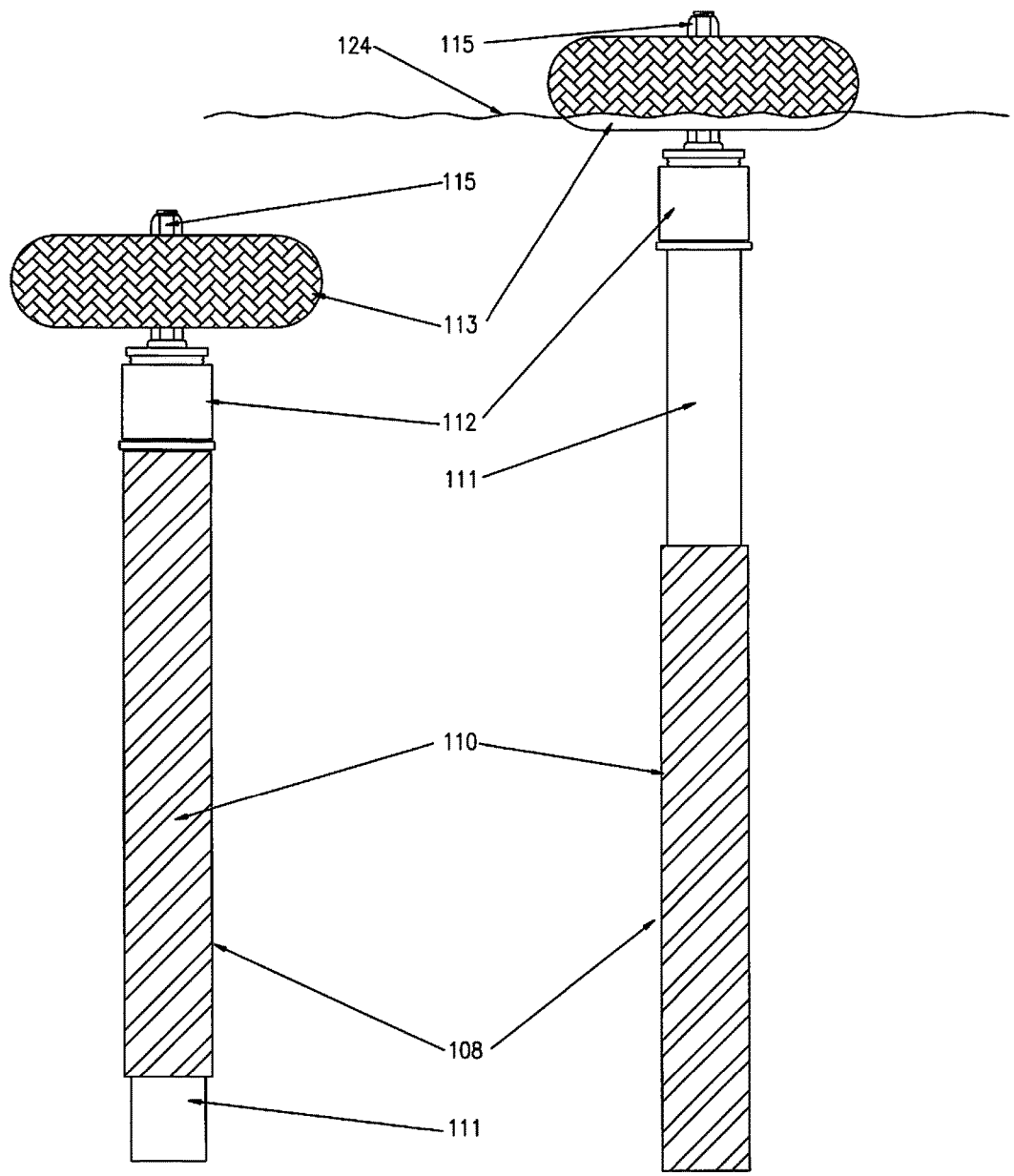
FIG. 5 is a front elevation view of a floating guide-on post assembly showing the floating guide-on post assembly in a retracted configuration.
FIG. 6 is a front elevation view of the floating guide-on post assembly showing the floating guide-on post assembly in an extended configuration.

As shown in FIGS. 1 and 3, although a rear portion of the bunk boards 103 may disappear beneath the surface of the water level 124, the wheel and tire 113 of the floatable guide-on post assemblies 108 will indicate the positions of a rear-end of the bunk boards 103 of the trailer 101, providing a guide path for a boat operator to guide a cavity 109 between the pontoons 102 of the pontoon boat 100 around the floating guide-on posts assemblies 108.

As shown in FIGS. 5, 6, 7 and 8, once the boat 100 is properly secured to the trailer 101 and the operator of the towing vehicle begins to move the boat 100 as mounted on the trader 101 out of the water, the water level 124 will recede relative to the guide-on posts 108 so that the guide-on posts 108 are no longer buoyed upon the water, but instead the guide-on posts 108 will move downwardly back to their original non-floating positions.

Unless defined otherwise, all technical and scientific terms used herein have the same meaning as commonly understood by one of ordinary skill in the art to which this invention belongs. Although any methods and materials similar or equivalent to those described herein also can be used in the practice or testing of the present invention, the preferred methods and materials are now described. The present invention has been described with reference to specific embodiments; however, it is understood that modifications and variations of the present invention are possible without departing from the scope of the invention, which is defined by the claims set forth below.

The invention claimed is:

1. A floating guide-on post assembly for a pontoon boat trailer comprising:
   a. An exterior support tube, wherein the exterior tube is open at both ends to allow water to enter the exterior support tube when submerged in water;
   b. An interior float tube within and in telescopic relation to the exterior support tube, wherein the interior float tube is open at an end proximal to the exterior support tube and is closed with a cap on another end distal from the exterior support tube;
   c. A wheel and tire assembly axially mounted on the distal end of the interior float tube and able to rotate about a vertical axis of the interior float tube; and
   d. A mounting means for attaching the exterior support tube to a rear cross member of a pontoon boat trailer frame, wherein the mounting bracket means is horizontally and vertically adjustable in relation to the rear cross member of the pontoon boat trailer frame.

2. The floating guide-on post assembly of claim 1 further wherein the interior float tube traps air within the tube as a water level rises above an open, proximal end of the interior float tube.

3. The floating guide-on post assembly of claim 1 further wherein the interior float tube comprises a material buoyant in water and able to support the wheel and tire assembly.

4. The floating guide-on post assembly of claim 1 further wherein the wheel and tire assembly is made buoyant by a means within the tire selected from a group consisting of air and foam.

5. The floating guide-on post assembly of claim 4 further wherein the wheel and tire assembly is buoyant and floats upon a water level when the post assembly is submerged in water.

6. The floating guide-on post assembly of claim 1, further wherein the interior float tube telescopically extends upwardly in relation to the exterior support tube as a water level rises above the open, proximal end of the interior float tube and telescopically retracts downwardly in relation to the exterior support tube as the water level falls below the open, proximal end of the interior float tube.

7. The floating guide-on post assembly of claim 1, further wherein the mounting means attaches the exterior support tube of each of a pair of floating guide-on post assemblies on the rear cross member of the pontoon boat trailer frame and the attached exterior support tube of each post assembly is relationally positioned to be within a cavity area formed between pontoons of a pontoon boat loaded on a pontoon boat trailer and with the wheel and tire assembly as mounted on the interior float tube within the exterior support tube of each post assembly to be in close proximity to a pontoon.

8. The floating guide-on post assembly of claim 7, further wherein the wheel and tire assembly rotates about the vertical axis of the interior float tube upon contact with the pontoon of the boat and guides the boat during loading on and unloading off a pontoon boat trailer.

9. The floating guide-on post assembly of claim 1 further comprising a retention cable which connects the interior float tube to the exterior support tube and prevents separation of the interior float tube from the exterior support tube.

10. A floating guide-on post assembly for a pontoon boat trailer comprising:
    a. An exterior support tube, wherein the exterior tube is open at both ends to allow water to enter the exterior support tube when submerged in water;
    b. An interior float tube within and in telescopic relation to the exterior support tube, wherein the interior float tube is open at an end proximal to the exterior support tube and is closed with a cap on another end distal from the exterior support tube;
    c. A wheel and tire assembly axially mounted on the distal end of the interior float tube and able to rotate about a vertical axis of the interior float tube; and
    d. A mounting means for attaching the exterior support tube to a rear cross member of a pontoon boat trailer frame, wherein the mounting bracket means is horizontally and vertically adjustable in relation to the rear cross member of the pontoon boat trailer frame;
    further wherein the interior float tube telescopically extends upwardly in relation to the exterior support tube as a water level rises above an open, proximal end of the interior float tube and telescopically retracts downwardly in relation to the exterior support tube as the water level falls below the open, proximal end of the interior float tube;
    further wherein the mounting means attaches the exterior support tube of each of a pair of floating guide-on post assemblies on the rear cross member of the pontoon boat trailer frame and the attached exterior support tube of each post assembly is relationally positioned to be within a cavity area formed between pontoons of a pontoon boat loaded on a pontoon boat trailer and with the wheel and tire assembly as mounted on the interior float tube within the exterior support tube of each post assembly to be in close proximity to a pontoon; and
    further wherein the wheel and tire assembly rotates about the vertical axis of the interior float tube upon contact with the pontoon of the boat and guides the boat during loading on and unloading off the pontoon boat trailer.

11. The floating guide-on post assembly of claim 10 further wherein the interior float tube traps air within the tube as the water level rises above an open, proximal end of the interior float tube.

12. The floating guide-on post assembly of claim 10 further wherein the interior float tube comprises a material buoyant in water and able to support the wheel and tire assembly.

13. The floating guide-on post assembly of claim 10 further wherein the wheel and tire assembly is made buoyant by a means within the tire selected from a group consisting of air and foam.

14. The floating guide-on post assembly of claim 13 further wherein the wheel and tire assembly is buoyant and floats upon a water level when the post assembly is submerged in water.

15. The floating guide-on post assembly of claim 10 further comprising a retention cable which connects the interior float tube to the exterior support tube and prevents separation of the interior float tube from the exterior support tube.

* * * * *